May 30, 1967 F. J. H. MACKERETH 3,322,662
ELECTROLYTIC OXYGEN SENSOR
Filed May 9, 1963
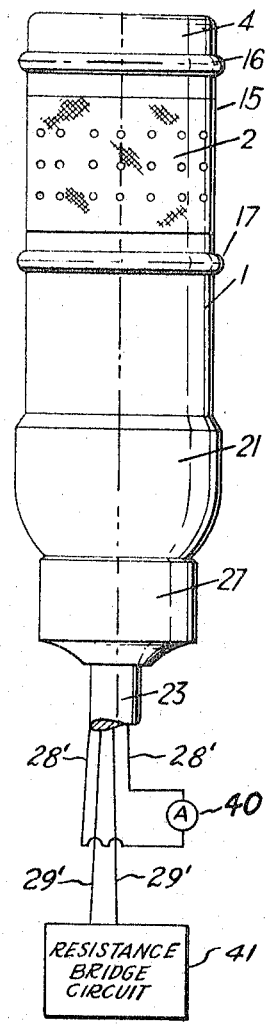
Fig. I.
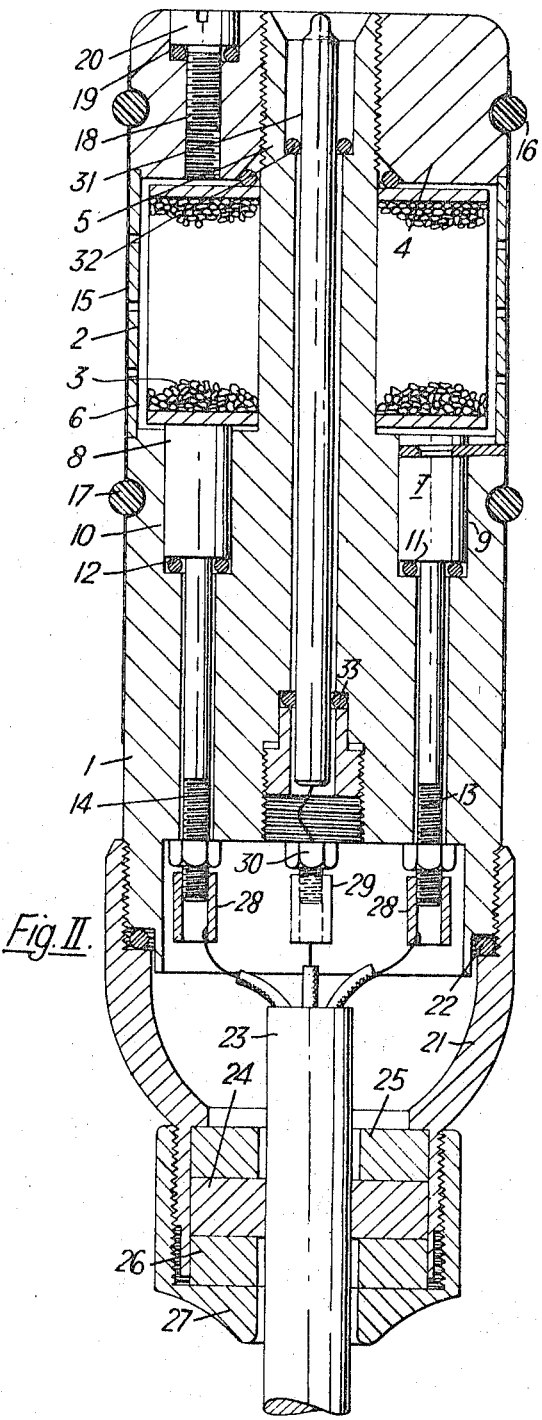
Fig. II.

3,322,662
ELECTROLYTIC OXYGEN SENSOR
Frederic John Haines Mackereth, Bowness-on-Windermere, England, assignor to National Research Development Corporation, a British company
Filed May 9, 1963, Ser. No. 279,187
Claims priority, application Great Britain, May 18, 1962, 19,294/62
9 Claims. (Cl. 204—195)

This invention relates to electro-chemical cells which are used in oxygen meters for measuring oxygen concentrations in fluids such as polluted water. Such cells have previously been expensive to manufacture and have had unstable sensitivities so that it has not been possible to take measurements over long periods without recalibration.

In accordance with the present invention, the electrochemical cell which in use is immersed in the fluid the oxygen concentration of which is to be measured comprises an outer electrode shielding an inner electrode, both of which are immersed in an aqueous electrolyte, and a membrane which is permeable to gaseous or dissolved oxygen but not to liquids or dissolved ions closely shielding the outer electrode from the fluid, the outer electrode providing a reaction surface on which oxygen that passes inwards through the membrane from the surrounding fluid reacts with the aqueous electrolyte to produce hydroxyl ions which are consumed in the total cell reaction when the two electrodes are connected through an external circuit, the current flowing in the external circuit being proportional to the rate of influx of oxygen through the membrane.

In use when the cell forms part of an oxygen meter the external circuit contains an ammeter. Oxygen passes inwards through the membrane at a rate which is proportional to the differential concentrations of oxygen on its two sides. Since the concentration of oxygen inside the cell is negligeable when the cell is in dynamic equilibrium in use, the rate of influx of oxygen is proportional to the concentration of oxygen in the surrounding medium. The electrons which are carried by the hydroxyl ions and give them their negative charges are obtained from the outer electrode which is therefore left with a deficiency of electrons and a residual positive charge with respect to the inner electrode. This causes an electron current to flow in the external circuit from the inner to the outer electrode. The loss of electrons from the inner electrode liberates positive metal ions which attract negatively charged ions in the electrolytic solution towards it where they are removed from the solution. In the condition of dynamic equilibrium the formation of hydroxyl ions at the outer electrode is equal to the electron current in the external circuit so that this current is proportional to the influx of oxygen through the membrane and hence to the concentration of oxygen in the surrounding medium.

The hydroxyl ions may be consumed by being the negatively charged ions which migrate to and are neutralised by the inner electrode and they will be precipitated out of the solution if this electrode consists of a metal of which the hydroxide is insoluble. Alternatively if the electrolyte is, for example, dilute sulphuric acid and the inner electrode is a metal the sulphate of which is insoluble, it will be the sulphate ions which migrate to and are neutralised by the inner electrode. The anion of the electrolyte should, however, be precipitated upon reaction with the inner electrode. When the electrolyte is dilute sulphuric acid, the hydroxyl ions will be consumed by association with the hydrogen ions from the sulphuric acid.

The outer electrode may be made of any of the metals such as gold, platinum and silver, of which oxygen electrodes are commonly made. The preferred metal, however, is silver since it is less expensive than the other metals.

The outer electrode is preferably a perforated cylinder which surrounds the inner electrode. The inner electrode may be a porous mass of a metal such as lead and is shielded by the outer electrode so that it is in a substantially oxygen-free medium and does not enter into side reactions with the oxygen entering the cell and upset the calibration of the cell. With this arrangement it is possible to provide large reaction surfaces on both the electrodes so that the characteristics of the electrodes do not change appreciably when the cell is working and it has a long life without recalibration. Because the outer electrode has a comparatively large area the surface area of the surrounding membrane can also be made large so that the quantity of oxygen passing through the membrane and consequently the magnitude of the current flowing in the external circuit is larger than has previously been possible. This enables cheap ammeters with a comparatively low sensitivity to be used.

The membrane may be made of rubber but this material is liable to perish easily and I have found that polyethylene is a better material for this purpose. Polyethylene sheeting of a few thousandths of an inch thick is permeable to oxygen but not to liquids or dissolved ions. The sensitivity of the cell may be varied by altering the thickness of the membrane.

One example of an oxygen meter having an electrochemical cell constructed in accordance with the present invention is illustrated in the accompanying drawings in which:

FIGURE I is a side elevation of a probe of the meter and showing schematically the electrical circuitry; and, FIGURE II is a central longitudinal section through the probe.

The probe of the meter has a Perspex body 1 in which a perforated cylindrical silver electrode 2 is mounted. Within the outer electrode 2 is an annular porous sintered lead electrode 3. Both these electrodes are held in place by a Perspex end cap 4 which is screwed onto a central spigot 5 of the body 1. The two electrodes are insulated from one another by an annular space 6 which contains a cylinder of porous polypropylene, such as that sold under the trade name "Porvic."

The silver and lead electrodes 2 and 3 are connected to silver and lead terminals 7 and 8 respectively. These terminals 7 and 8 are received in recesses 9 and 10 respectively in the Perspex body 1 and O ring seals 11 and 12 are compressed between the terminals and body. The terminals 7 and 8 are screwed to brass studs 13 and 14 respectively.

The silver electrode 2 is closely surrounded by a thin polyethylene tubular membrane 15 which is held in place by two O rings 16 and 17 which are located in annular grooves in the cap 4 and body 1 respectively.

The space within the electrode 2 is filled with an electrolyte consisting of a saturated aqueous solution of potassium hydrogen carbonate. This electrolyte which percolates throughout the lead electrode 3 is introduced into the cell through an inlet 18 in the cap 4. This introduction is actually carried out by means of a syringe the nozzle of which fits tightly into an O ring 19 at the entrance to the inlet. Repeated injection and withdrawal of the electrolyte finally removes air bubbles from within the cell. After the cell has been filled the inlet 18 is sealed by a stainless steel screwed plug 20.

At its lower end the body 1 is screwed to a brass end cap 21 and is sealed to it by an O ring seal 22. A four core cable 23 passes inwards through the cap 21 and is sealed to it by means of a gland consisting of a rubber washer 24 which is compressed between two thrust washers 25 and 26 when a nut 27 is screwed on to the cap 21. Two of the wires in the cable are soldered to connectors 28 which are push fits over the projecting ends of the brass studs 13 and 14.

The other two wires are soldered to connectors 29 which are push fits over the projecting ends of brass connecting studs 30 which are in turn soldered to the lead in wires of a thermistor 31 which contains a temperature sensitive resistance element. This thermistor extends along axial bore in the spigot 5 and passes through the centre of the cell. It is sealed in the bore by O ring seals 32–33.

The two wires 28' which are soldered to the connectors 28 are connected at the other end of the cable 23 to a micro-ammeter 40 which has an internal resistance of 60 ohms or slightly less and which gives a full scale deflection with a current of approximately 300 micro-amps. The smaller the valve is of this internal resistance, the smaller is the response time of the cell. The ammeter also has a shunt resistance by which its sensitivity may be halved.

The two wires 29' which are connected to the thermistor are connected at the other end of the cable 23 in one arm of a conventional resistance bridge circuit 41. In this circuit the resistance of the thermistor element is balanced by a calibrated helical potentiometer and the resistance and hence the temperature of the thermistor resistance element is read from the potentiometer setting.

The probe of the meter is intended to be hung by the cable 23 beneath the surface of the water, the oxygen concentration of which is to be measured. Oxygen in the water, but neither the water itself nor any ionic bodies in the water, penetrates the membrane 15 and reacts on the surface of the electrode 2 to form negatively charged hydroxyl ions. These ions migrate through the perforations in the silver electrode 2 to the lead electrode 3 where they react with lead ions and are precipitated out of the solution as lead hydroxide. A current corresponding to the migration of the hydroxyl ions to the lead electrode flows in the external circuit and causes a corresponding deflection of the ammeter.

The sensitivity of the meter depends on the effective area of the silver electrode 2 which is shielded by the membrane 15, the thickness and hence the permeability of the membrane 15 and the temperature at which the cell is working. The sensitivity of the cell increases as the thickness of the membrane decreases since this allows a greater flow of oxygen inwards from the surrounding medium. The membrane however should not be less than three thousandths of an inch thick otherwise it is not strong enough to stand up to the stresses of use. In the illustrated example, the area of the silver electrode 2 which is serrated is four and a half square inches and the membrane is three thousandths of an inch thick. At 15° centigrade this cell has a sensitivity of twenty-two micro-amps per part per million of oxygen in the surrounding medium. This is equivalent to a meter reading of about two hundred micro-amps when the probe is immersed in water which is saturated with air at one atmosphere at that temperature.

If the cell is used at ambient temperatures of less than 10° C., the corresponding decrease in sensitivity may be counteracted by halving the thickness of the membrane.

Allowance is made for the temperature variation by using a temperature/sensitivity curve. Before a reading is taken the resistance bridge circuit is balanced and the temperature is read from the potentiometer setting. The corresponding sensitivity is then read from the temperature/sensitivity curve and the ammeter reading is then easily converted to an oxygen concentration.

Because of the comparatively large surface area of the lead and silver electrodes, the cell is so stable that it can be dismantled and reassembled without effecting its sensitivity. Its current output varies linearly with the oxygen concentration in the surrounding medium up to a concentration of at least fifty parts per million oxygen. At very much higher concentrations the effective concentration of oxygen within the cell will not be negligible and the rate of flow of oxygen through the membrane will therefore not be effectively proportional to the oxygen concentration in the surrounding medium.

The saturated potassium hydrogen carbonate is particularly suitable since it has a constant pH and is not effected by any carbon dioxide which may penetrate into the cell. The life of the cell before it need be regenerated depends upon the rate of conversion of the lead electrode into lead hydroxide. In the illustrated example the lead electrode weighs 150 gms. and when the cell is giving an output of two hundred micro-amps, 830 days of continuous operation would consume one tenth of the available lead. The characteristics of the cell would of course be altered before this stage is reached but the cell in practice has a stable working life of about 300 days.

The cell may be regenerated by dismantling the parts and cleaning the silver electrode in diluted nitric acid. The lead electrode may be replaced or regenerated by electrolitic reduction of the hydroxide which is adhering to the metallic lead.

I claim:
1. An electro-chemical cell for measuring oxygen concentrations of a fluid in which the cell is in use immersed, said cell comprising, an enclosure adapted to contain a mass of aqueous electrolyte, said enclosure being substantially completely formed by a first wall portion and a second wall portion, the first wall portion being substantially completely impermeable to gas and liquid, and the said second wall portion being cylindrical and formed by a membrane having an internal and external surface and being permeable to gaseous or dissolved oxygen but impermeable to liquids or dissolved ions, the said external surface of the said membrane being adapted to be brought into communication with a fluid the oxygen concentration of which is to be measured, the said internal surface of said membrane being in contact with said aqueous electrolyte within said enclosure, an inner electrode within said enclosure in contact with said electrolyte, a perforated cylindrical outer electrode within said enclosure in contact with said electrolyte and which surrounds said inner electrode to form a barrier between said inner electrode and said membrane wherein the reaction surface of said outer electrode is closely surrounded by said membrane over substantially the whole of said internal surface of said membrane in contact with said electrolyte, and means connecting said inner and outer electrodes to an external electrical circuit, whereby when said cell is immersed in an oxygen carrying fluid, oxygen that passes inwards through said membrane reacts with said aqueous electrolyte on said reaction surface to produce hydroxyl ions which are consumed in the total cell reaction and the current flowing in said external circuit is proportional to the rate of influx of oxygen through said membrane.

2. A cell according to claim 1, in which the inner electrode is a porous mass.

3. A cell according to claim 1 in which the outer electrode is silver.

4. A cell according to claim 1, in which the inner electrode is lead.

5. A cell according to claim 1, in which the electrolyte is saturated potassium bicarbonate.

6. A cell according to claim 1, in which the membrane is made of polyethylene.

7. A cell according to claim 1, in which an electrical resistance element having a high temperature sensitivity is embedded in the cell adjacent to the electrolyte.

8. A cell according to claim 7 including an ammeter connected in an external circuit between the two electrodes.

9. A cell according to claim 7 including an ammeter connected in an external circuit between the two electrodes and a resistance bridge circuit containing the resistance element in one arm.

References Cited

UNITED STATES PATENTS

| | | | |
|---|---|---|---|
| 2,898,282 | 8/1959 | Flook et al. | 204—195 |
| 2,913,386 | 11/1959 | Clark | 204—195 |
| 2,943,028 | 6/1960 | Thayer et al. | 204—195 |
| 3,000,805 | 9/1961 | Carritt et al. | 204—195 |
| 3,028,317 | 4/1962 | Wilson et al. | 204—195 |
| 3,050,371 | 8/1962 | Dowson et al. | 204—195 |
| 3,070,539 | 12/1962 | Arthur et al. | 204—195 |
| 3,098,813 | 7/1963 | Beebe et al. | 204—195 |
| 3,188,285 | 4/1965 | Watanabe et al. | 204—195 |
| 3,196,100 | 7/1965 | Digby | 204—195 |
| 3,223,597 | 12/1965 | Hersch | 204—195 |
| 3,239,444 | 3/1966 | Heldenbrand | 204—195 |
| 3,246,235 | 4/1966 | Allsopp | 204—195 |

JOHN H. MACK, *Primary Examiner.*

T. H. TUNG, *Assistant Examiner.*